(12) United States Patent
Mayer

(10) Patent No.: US 9,738,212 B2
(45) Date of Patent: Aug. 22, 2017

(54) MOTOR VEHICLE

(71) Applicant: AUDI AG, Ingolstadt (DE)

(72) Inventor: Stefan Mayer, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/358,398

(22) PCT Filed: Oct. 19, 2012

(86) PCT No.: PCT/EP2012/004393
§ 371 (c)(1),
(2) Date: May 15, 2014

(87) PCT Pub. No.: WO2013/072001
PCT Pub. Date: May 23, 2013

(65) Prior Publication Data
US 2014/0313026 A1   Oct. 23, 2014

(30) Foreign Application Priority Data

Nov. 16, 2011  (DE) .......................... 10 2011 118 687

(51) Int. Cl.
*B60Q 1/00* (2006.01)
*B60T 17/22* (2006.01)
(Continued)

(52) U.S. Cl.
CPC ................ *B60Q 1/00* (2013.01); *B60T 17/18* (2013.01); *B60T 17/22* (2013.01); *F01N 13/082* (2013.01);
(Continued)

(58) Field of Classification Search
CPC .. B60T 17/18; B60T 17/22; B60W 2510/068; B60W 2710/0688; B60W 2710/184
(Continued)

(56) References Cited

U.S. PATENT DOCUMENTS 4,790,606 A * 12/1988 Reinecke ...................... 303/191
4,933,852 A *  6/1990 Lemelson ................ G01B 3/18
                                                      340/438
(Continued)

FOREIGN PATENT DOCUMENTS

CN          2693146        4/2005
CN        101469634        7/2009
(Continued)

OTHER PUBLICATIONS

English language copy of International Search Report for PCT/EP2012/004393, mailed on Apr. 24, 2013, 2 pages.
(Continued)

*Primary Examiner* — Hai Phan
*Assistant Examiner* — Royit Yu
(74) *Attorney, Agent, or Firm* — Staas & Halsey LLP

(57) ABSTRACT

A motor vehicle has at least one drive unit, at least one brake device and at least one component which heats up when the drive unit and/or the brake device are operated. The component includes at least one warning device which is designed to output a visual warning information item when a component-specific limiting temperature is exceeded by the component, and/or can be actuated to output a visual warning information item when an information item which relates to a component-specific limiting temperature being exceeded is present.

26 Claims, 1 Drawing Sheet

(51) Int. Cl.
  *B60T 17/18* (2006.01)
  *G01K 11/12* (2006.01)
  *F01N 13/08* (2010.01)
  *F01P 11/14* (2006.01)

(52) U.S. Cl.
  CPC ....... *G01K 11/12* (2013.01); *B60W 2510/068* (2013.01); *B60W 2710/0688* (2013.01); *B60W 2710/184* (2013.01); *B60Y 2302/03* (2013.01); *B60Y 2400/90* (2013.01); *F01N 2510/00* (2013.01); *F01P 11/14* (2013.01)

(58) Field of Classification Search
  USPC ........................................................ 340/449
  See application file for complete search history.

(56) References Cited

U.S. PATENT DOCUMENTS

| | | | | |
|---|---|---|---|---|
| 5,499,597 | A * | 3/1996 | Kronberg | B23K 37/006 |
| | | | | 116/216 |
| 5,544,949 | A * | 8/1996 | Schmitt et al. | 303/140 |
| 5,644,287 | A * | 7/1997 | Nouri | B60R 25/1001 |
| | | | | 307/10.2 |
| 5,830,529 | A * | 11/1998 | Ross | B41M 3/12 |
| | | | | 101/211 |
| 6,804,598 | B2 * | 10/2004 | Eckert et al. | 701/71 |
| 6,934,618 | B2 | 8/2005 | Eckert et al. | |
| 7,152,935 | B2 * | 12/2006 | Kinder et al. | 303/191 |
| 7,228,944 | B2 * | 6/2007 | Fischle et al. | 188/1.11 R |
| 7,230,207 | B2 * | 6/2007 | Witzke et al. | 219/219 |
| 7,418,788 | B1 | 9/2008 | Herr et al. | |
| 7,497,305 | B2 * | 3/2009 | Miller et al. | 188/1.11 E |
| 8,380,418 | B2 * | 2/2013 | Bae et al. | 701/92 |
| 2002/0066616 | A1 * | 6/2002 | Wessman | B60T 8/1755 |
| | | | | 180/446 |
| 2003/0021975 | A1 * | 1/2003 | Martin | 428/293.4 |
| 2003/0192531 | A1 * | 10/2003 | Bachinski et al. | 126/500 |
| 2003/0209654 | A1 * | 11/2003 | Smith | H05B 37/0209 |
| | | | | 250/214 SW |
| 2006/0081639 | A1 * | 4/2006 | Lazaroff | A47J 27/212 |
| | | | | 220/573.1 |
| 2006/0250227 | A1 * | 11/2006 | Naito | 340/447 |
| 2007/0131493 | A1 * | 6/2007 | Linke | F16D 65/092 |
| | | | | 188/1.11 R |
| 2007/0179686 | A1 * | 8/2007 | Devlieg et al. | 701/9 |
| 2007/0180869 | A1 * | 8/2007 | Geyer | D06F 39/005 |
| | | | | 68/196 |
| 2009/0010305 | A1 * | 1/2009 | Meijer et al. | 374/161 |
| 2009/0159047 | A1 * | 6/2009 | Eto et al. | 123/435 |
| 2010/0114339 | A1 * | 5/2010 | Kaiser et al. | H05B 3/746 |
| | | | | 700/90 |
| 2012/0193002 | A1 * | 8/2012 | Tracy | D06F 79/06 |
| | | | | 150/165 |
| 2013/0103242 | A1 * | 4/2013 | Takeuchi et al. | 701/22 |

FOREIGN PATENT DOCUMENTS

| | | |
|---|---|---|
| CN | 201599095 | 10/2010 |
| DE | 4020693 | 2/1992 |
| DE | 4024771 | 2/1992 |
| DE | 19724992 | 12/1998 |
| DE | 20310653 | 9/2003 |
| DE | 10237457 | 2/2004 |
| DE | 102004035022 | 3/2006 |
| DE | 102004057550 | 6/2006 |
| DE | 102005034097 | 8/2006 |
| DE | 102005019276 | 11/2006 |
| DE | 10 2005 055 118 A1 | 5/2007 |
| DE | 102007015841 | 6/2008 |
| DE | 10150276 | 12/2008 |
| DE | 102008009098 | 8/2009 |
| DE | 202009008377 | 9/2009 |
| DE | 102008024627 | 11/2009 |
| DE | 102011118687.9 | 11/2011 |
| EP | 1359077 | 11/2003 |
| EP | 1359078 | 11/2003 |
| EP | 2012/004393 | 10/2012 |

OTHER PUBLICATIONS

WIPO English Language Translation of the International Preliminary Report on Patentability for PCT/EP2012/004393, mailed May 30, 2014, 7 pages.

European Examination Report dated Jun. 5, 2015 from European Application No. 12780096.9, 6 pages.

Chinese Office Action dated Apr. 1, 2015 from Korean Patent Application No. 201280009203.6, 10 pages.

European Office Action dated Mar. 16, 2017, from European Patent Application No. 12780096.9, 5 pages.

* cited by examiner

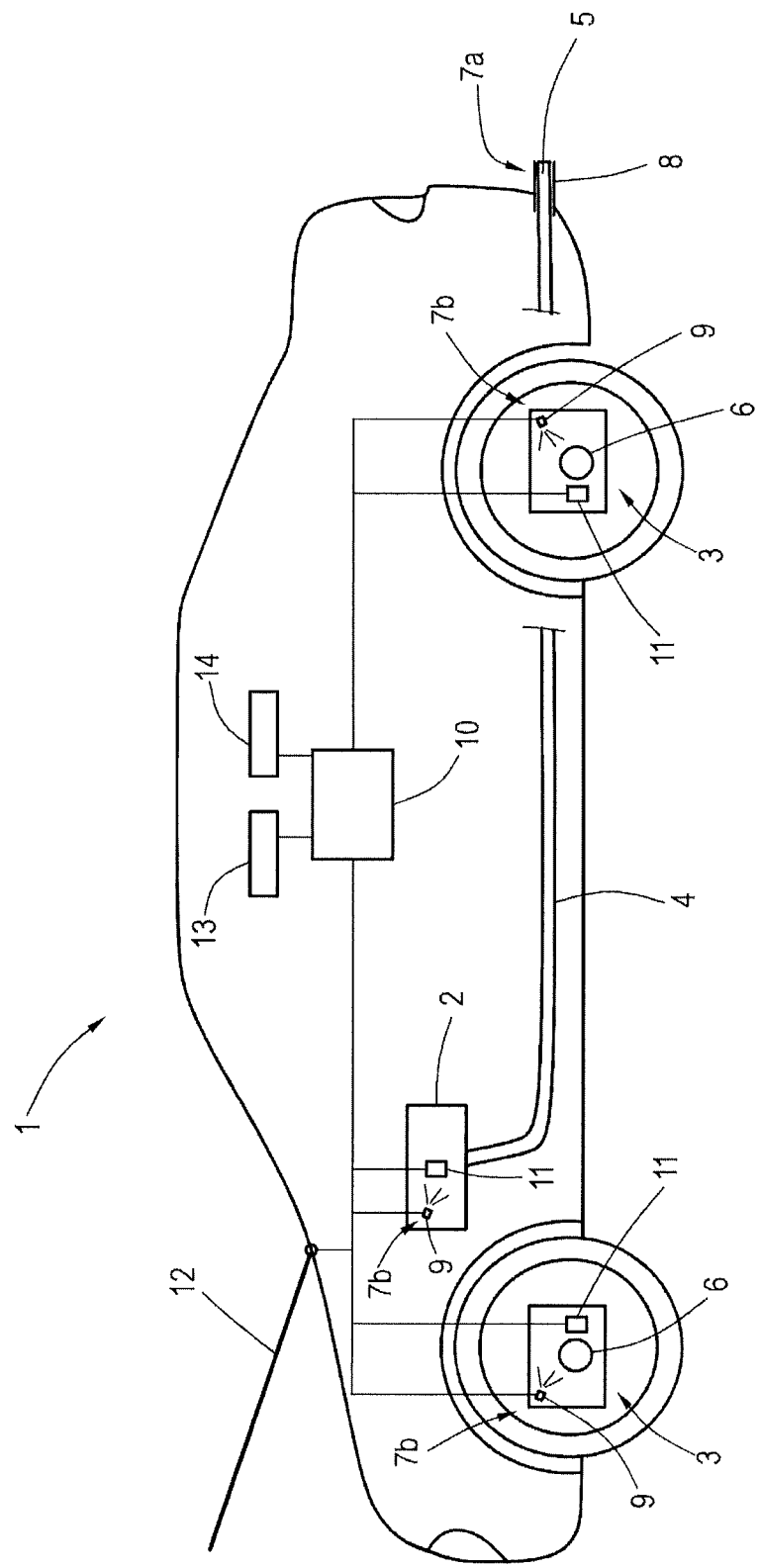

MOTOR VEHICLE

CROSS REFERENCE TO RELATED APPLICATIONS

This application is based on and hereby claims priority to International Application No. PCT/EP2012/004393 filed on Oct. 19, 2012 and German Application No. 10 2011 118 687.9 filed on Nov. 16, 2011, the contents of which are hereby incorporated by reference.

BACKGROUND

The invention relates to a motor vehicle comprising at least one drive unit, at least one brake device and at least one component which heats up when the drive unit and/or the brake device is operating.

It is known that certain components of a motor vehicle heat up during operation, i.e. in particular when the drive unit is operating, such as for example when an internal combustion engine is operating. Further components which are included in a brake device which is provided on the motor-vehicle-side also experience heating when the brake device is activated, i.e. during braking operations of the motor vehicle.

If the corresponding components of the motor vehicle are accessible to persons, there is a risk of combustion-related injuries to persons as soon as said persons enter into contact with the components which are frequently heated to high temperatures above 100° C. There is a particular risk here from the fact that the actual temperature of the respective components is usually not apparent from the outside, i.e. in particular visually.

SUMMARY

One possible object is to specify a motor vehicle which permits easy estimation of the temperature of components which heat up during operation of the drive unit and/or of the brake device.

The inventor proposes a motor vehicle of the type mentioned at the beginning, which is distinguished by the fact that the component comprises at least one warning device which is designed to output a visual warning information item when a component-specific limiting temperature is exceeded by the component, and/or can be actuated to output a visual information item when an information item relating to a component-specific limiting temperature being exceeded is present.

The warning device which is provided and which is included in the respective component of the motor vehicle which heats up during operation of the drive unit and/or of the brake device serves to inform a person about the heating up of the respective component in the form of the outputting of a visual warning information item. The visual warning information item can basically be output in two ways depending on the warning device respectively used. On the one hand, it is possible for a warning device to be provided which is designed to output a visual warning information item when a component-specific limiting temperature is exceeded by the component. This warning device automatically outputs a visual warning information item when a component-specific limiting temperature is exceeded by the respective component. The function of a corresponding warning device can be based, for example, on material-specific or material-inherent properties of the warning device which change as a function of the temperature of the warning device, which is, of course, coupled to the temperature of the respective component, these being, in particular, visual properties of the warning device. Exemplary embodiments in this respect will also be specified below.

The component-specific limiting temperature is determined in this case, in particular, by the material properties, in particular the chemical-physical structure, of the warning device. Consequently, a limiting temperature which is matched to a specific component and at the reaching or exceeding of which temperature the warning device outputs a visual warning information item can be set by a specific composition of the warning device. It is conceivable for warning device for different components with respectively different component-specific limiting temperatures to be provided.

On the other hand, it is, where appropriate additionally, possible that a, where appropriate, further warning device is provided which can be actuated to output a visual warning information item when an information item which relates to a component-specific limiting temperature being exceeded is present. This warning device therefore receives a control signal to output a corresponding visual warning information item when a corresponding information item which relates to a component-specific limiting temperature being exceeded by a component is present, for example from a control device which is present on the motor-vehicle-side and which can equally determine the information item which relates to a component-specific limiting temperature being exceeded. In contrast to the above embodiment of a warning device, the warning device here accordingly does not output the visual warning information item automatically but rather as a function of a control signal, which control signal is in turn generated only when the information item which relates to a component-specific limiting temperature being exceeded is present.

In this context, at least one temperature sensor system which detects the actual temperature and is connected to the warning device is expediently assigned to the respective component for the purpose of determining the information item which relates to the component-specific limiting temperature being exceeded. The temperature sensor system supplies an accurate picture of the actual temperature of the respective component, with the result that the component-specific temperature signals which are supplied thereby can be used to check, while taking into account the component-specific limiting temperature which is stored, for example, in a memory provided on the motor-vehicle-side, whether an information item which relates to a component-specific limiting temperature being exceeded should be generated. In this context, in particular a comparison of the actual temperature of the respective component with the respective component-specific limiting temperature is to be made.

A temperature sensor system can have here a plurality of temperature sensors which are connected to the respective component and are arranged distributed thereon. In this way, for example temperature profiles or temperature gradients of the respective component can also be determined in order thus to obtain a comprehensive picture of the temperature or of the temperature distribution of the respective component. Consequently it is possible to adapt the outputting of the visual warning information item or the actuation of the warning device as a function of the temperature distribution to a component. Consequently, a warning device, for example for relatively warm regions of a component, can have, for example, a first visual warning information item which is, where appropriate, more clearly perceptible, for example owing to increased color intensity, and a visual warning information item which is less clearly perceptible in comparison for comparatively cold regions of the component.

It is also conceivable that the information item which relates to a component-specific limiting temperature being exceeded is based on a model which relates to the cooling behavior of the respective component. In this case, the actual temperature of the respective component is not determined but instead estimated on the basis of a suitable model, if appropriate using corresponding characteristic curves which permit operating states of a motor vehicle and/or of the respective component to be assigned to specific temperatures of the respective component. In this context, in particular component-specific characteristic values which relate to the heating behavior and/or cooling behavior of the respective component are taken into account. In this context it is also conceivable to simulate the heating behavior or cooling behavior of the respective component and to determine, on the basis of the simulation, the information item which relates to a component-specific limiting temperature being exceeded.

The component-specific limiting temperature is defined, in particular, by component-specific limiting temperatures which are predefined at the factory or can be defined by the user. Consequently, it is possible to set or to be able to set when and on reaching which actual temperature the respective component generates a corresponding information item which relates to a component-specific limiting temperature being exceeded, and the warning device is subsequently actuated to output the visual warning information item.

A corresponding component may be, for example, a part of the exhaust system, in particular an output pipe and/or a part of the brake system, in particular a brake disk and/or the drive unit of the motor vehicle. Of course, this numeration is not conclusive.

The warning device can be designed to change its color and/or its transmission when the component-specific limiting temperature is exceeded. Both effects are based essentially on an at least partial or temporary change in the chemical structure of the warning device, which brings about a change of color and/or a change in the transmission, i.e. the transparency with respect to visible light or the absorption behavior with respect to visible light. In the first case, the temperature-related color change of the warning device brings about a change in the color of the warning device into a color tone which is visually easy to perceive or is a warning color tone. In the second case, the warning device expediently covers a layer of color which is visually easy to perceive or is a warning layer of color and which can be seen as a result of the temperature-induced change in the transmission of the warning device. That is to say when the component-specific limiting temperature is exceeded, the warning device is largely or completely transparent, which occurs as a rule in the case of transmission above approximately 80%, with the result that the layer of color which is visually easy to perceived or is a warning layer of color which is below it comes to the fore.

In this embodiment, the warning device is preferably present as a thermochromic coating which is applied at least in certain sections to the component and/or a thermochromic element which is connected to the component and/or a thermochromic material which is contained within the material forming the component. The effect of thermochromism as well as corresponding materials are known. This is an effect of the reversible or irreversible change of color of a connection when the temperature changes. In the case of thermochromic connections, a structural phase change occurs in a specific temperature range and said phase change causes another range of the visible spectrum of light to be absorbed. The remaining reflected light combines to form a new color of the thermochromic material.

As mentioned, the thermochromic material can be applied, for example, as a coating to the respective component, or can be connected to the respective component as an element, for example in the form of an adhesive film or a sticker, which is connected to the respective component, or can be present as a part of the material forming the component. In the two first-mentioned alternatives it is possible, in order to improve the perceptibility, to construct the thermochromic material at least partially with three-dimensional surface patterning, for example in the form of prisms or Fresnel lenses.

Alternatively it is conceivable that the warning device is designed to at least partially illuminate the component when the component-specific limiting temperature is exceeded and/or when the information item which relates to a component-specific limiting temperature being exceeded is present. The warning device serves in this embodiment as a lighting unit in the sense of a lamp or LED, which lighting unit causes the respective component to be illuminated if an information item which relates to a component-specific limiting temperature being exceeded is present. Consequently, depending on the presence of the information item, the warning device which is embodied as a lighting unit is actuated or activated. The respective component can be illuminated directly or indirectly by the lighting unit. Consequently, the lighting unit can directly irradiate the respective component or indirectly irradiate the respective component via an optical element in order to generate indirect illumination. Basically, the most homogeneous possible illumination or irradiation of the respective component is the aim. In all cases, the visual warning information item is preferably light which is emitted by the warning device, in particular reddish or red light. Reddish or red-colored light is generally particularly easily perceived by people and also indicates that the respective component involves a certain level of danger or risk of injury, and so people can easily perceive that touching the respective component can entail potential danger or injury. Of course, other color tones or coloring of the visual warning information items is basically also possible. A welcomed secondary effect here is that the corresponding components of the motor vehicle have, by virtue of the outputting of the visual warning information item, i.e. in particular as a result of the outputting of the colored, i.e. in particular reddish or red, light, a visually appealing effect and are perceived as symbols of force and dynaism.

In one expedient development there is provision that the color intensity of the visual warning information depends on the temperature of the respective component. In this way it is possible to more clearly indicate the level of danger or risk of injury which is associated with the respective component, with the result that corresponding high color intensities, indicating high temperatures of the component, indicate, for example, a correspondingly high level of danger or risk of injury. Furthermore it is possible that the change in the temperature of the respective component, for example during cooling processes, can be tracked visually, with the result that, for example, a time which only a low level of danger or a small risk of injury is associated with the component, can be perceived.

In a further embodiment, the warning device or a further warning device which is provided on the motor-vehicle-side is designed additionally to output an audible warning information item when the component-specific limiting temperature is exceeded and/or when the information item which relates to a component-specific limiting temperature being exceeded is present. The audible warning information item, which can be output, for example, as a warning tone of a horn which is provided on the motor-vehicle-side, supplies an additional indication to the object approaching the respective heated components of the motor vehicle that there is a level of danger or risk of injury associated with said object.

The proposed motor vehicle can expediently also comprise at least one proximity sensor for determining a distance of an object from the component, wherein the warning device can be actuated to output the visual warning information item when a distance information item which relates to a specific distance threshold value being undershot by the warning is present. In this case, in particular in addition to the presence of the information item which relates to a component-specific limiting temperature being exceeded, the warning device is expediently not actuated to output the visual warning information item until an information item which relates to a specific threshold value for the distance from the respective component being undershot by the object is present. Consequently, the undershooting of the minimum distance of the object from the respective component is used as a periphery condition which is to be additionally met, without which a corresponding actuation of the warning device to output the visual warning information item does not occur, nor does, under certain circumstances, the audible warning information item either. The minimum distance can be predefined at the factory or can be predefinable by an operator.

The visual and/or, if appropriate, audible warning information item can advantageously be output only when the motor vehicle is stationary. In this way, the outputting of the visual warning information item can be prevented from distracting the driver or other road users during driving.

BRIEF DESCRIPTION OF THE DRAWINGS

These and other objects and advantages of the present invention will become more apparent and more readily appreciated from the following description of the preferred embodiments, taken in conjunction with the accompanying drawing of which:

The single FIGURE shows a basic illustration of a proposed motor vehicle.

DETAILED DESCRIPTION OF THE PREFERRED EMBODIMENT

Reference will now be made in detail to the preferred embodiments of the present invention, examples of which are illustrated in the accompanying drawing, wherein like reference numerals refer to like elements throughout.

The FIGURE shows a basic illustration of a proposed motor vehicle 1. The motor vehicle 1 comprises a drive unit 2, for example in the form of an internal combustion engine, and a plurality of brake devices 3 which are assigned to the wheels of the motor vehicle 1, as well as a plurality of components which heat up during operation of the drive unit 2 and/or of the brake devices 3. These include, for example, parts of the exhaust system 4, in particular the output pipe 5 which is associated therewith, and/or parts of the brake devices 3 such as, in particular, the brake disks 6. Of course, the drive unit 2 itself should also be considered to be a corresponding component of the motor vehicle 1. Basically, corresponding components of the motor vehicle 1 are at least partially visible, and at least partially accessible from the outside.

It is problematic that the operationally conditioned high temperature of the respective components can only perceived from the outside, in particular visually, with difficulty with the result that when an object, for example a person, approaches a corresponding component or when a corresponding component is in contact with an object there can be a level of danger or a risk of injury or damage to the object.

For this reason, in the case of the proposed motor vehicle 1 there is provision that a corresponding component of the motor vehicle 1 comprises at least one warning device 7a which is designed to output a visual warning information item when a component-specific limiting temperature is exceeded by the component. Alternatively or additionally, it is conceivable that a corresponding component of the motor vehicle 1 comprises a warning device 7b which can be actuated to output a visual warning information item when an information item I which relates to a component-specific limiting temperature being exceeded is present.

The warning device 7a is applied as a thermochromic coating 8 to the output pipe 5 of the exhaust system 4. Consequently, the warning device 7a, i.e. the thermochromic coating 8, is designed to change its color when the component-specific limiting temperature is exceeded. If appropriate, a temperature-induced change in the transmission of the thermochromic coating 8 can also be provided. The thermochromic coating 8 has a chemical structure which experiences an inherently material-induced color change from a, for example, dark initial color to a reddish or red, i.e. visually easily perceived or warning color tone, when a limiting temperature of, for example, 100° C. is exceeded. In addition to the coating of the output pipe 5 with the thermochromic coating 8, it is also possible to apply a thermochromic adhesive film or a thermochromic sticker to the output pipe 5. Both the thermochromic coating 8 and corresponding thermochromic adhesive films or stickers can have a specific three-dimensional surface patterning in order to improve the visual perceptibility thereof.

The warning device 7b is embodied as lighting unit 9, for example in the form of at least one LED. The lighting unit 9 which are assigned to the brake devices 3 or the drive unit 2 or directed toward the latter can be actuated by a control device 10, i.e. can be activated and deactivated as well as, if appropriate, changed in terms of the color intensity of the light which they emit, i.e. can be dimmed. The dimming capability makes it possible for the color intensity of the visual warning information item which is output by the lighting unit 9, i.e. the light which is emitted by the latter, to be variable as a function of the temperature of the respective component.

The light which is emitted by the lighting unit 9 is reddish or red, i.e. it has a visually easily perceived or warning color tone. A welcomed secondary effect here is that the components of the motor vehicle 1 which are correspondingly illuminated with a reddish or red color by the lighting unit 9 have a visually appealing effect, and in particular the corresponding components are perceived as symbols of strength and dynaism. Of course, the light which is emitted by the thermochromic coating 8 which is applied to the output pipe 5 also has the same effect.

The control device 10 is likewise designed to check for the presence of the information item I which relates to a component-specific limiting temperature being exceeded. For this purpose, the control device 10 communicates with the temperature sensor systems 11 which are assigned to the respective components and each comprise at least one temperature sensor. The temperature sensor systems 11 are designed to determine whether the component-specific limiting temperature is exceeded, i.e. they sense the actual temperature of the respective components and supply them in the manner of signals to the control device 10, which subsequently makes a comparison of the respective actual temperatures of the respective components with component-specific temperature limiting values which are stored in a memory, in order in this way to check for the presence of the information item I which relates to a component-specific limiting temperature being exceeded.

It is also conceivable that an information item I which relates to a component-specific limiting temperature being exceeded is based on a model which relates to the heating behavior or cooling behavior of a respective component. In this case, there are suitable calculation algorithms present in the control device 10, which algorithms permit the actual temperature of the respective component to be estimated in order subsequently to check for the presence of the information item I which relates to a component-specific limiting temperature being exceeded.

The information item I can in this respect be component-specific insofar as, for example, the drive unit 2 may have exceeded its component-specific limiting temperature, with the result that the warning device 7b which are associated with said drive unit 2 is activated by the control device 10 by corresponding actuation signals, and said warning device 7b illuminates the drive unit 2, while the brake disks 6 of the brake devices 3 have not reached their respective component-specific limiting temperatures, with the result that the warning device 7b which are assigned thereto are not switched on by corresponding control signals which are transmitted by the control device 10.

In the case of the warning device 7b which are associated with the drive unit 2, the actuation of said warning device 7b is expediently linked to the opening of the engine hood 12, which can also be sensed by the control device 10 by a suitable sensor system. Consequently, the warning device 7b which are associated with the drive unit 2 can be actuated, i.e. activated, only when the engine hood 12 is opened.

The motor vehicle 1 also comprises a proximity sensor 13 for determining a distance of an object from a corresponding component of the motor vehicle 1. The warning device 7b are consequently actuated to output the visual warning information item by the control device 10 if appropriate only when a distance information item which relates to a specific distance threshold value being undershot by the object is present. Accordingly, the lighting unit 9 emit only reddish or red light if there is an object located at a distance from the respective component of the motor vehicle 1 which is below the distance threshold value.

In this context it is also expedient if a further warning device 14 which is provided on the motor-vehicle-side and is in the form of a horn or the like is designed additionally to output an audible warning information item when the component-specific limiting temperature is exceeded and/or the information item I which relates to a component-specific limiting temperature is exceeded. Consequently, an object which approaches a heated up component of the motor vehicle 1 can be warned not only visually but also audibly about the level of danger or risk of injury associated with said component.

The visual and/or, if appropriate, audible warning information item can advantageously be output only when the motor vehicle 1 is stationary. Accordingly, the control device 10 actuates the warning device 7b, i.e. the lighting unit 9 and the warning device 14 only when the stationary state of the motor vehicle 1 is detected, which stationary state can be determined, for example, by determining the rotational speed of the wheels of the motor vehicle 1. The risk of possibly dangerous distraction of the driver during driving by the warning device 7b in the form of the lighting unit 9 illuminated components is in this respect prevented. Other road users cannot be distracted by the warning device 7b, 14 either.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV,* 69 USPQ2d1865 (Fed. Cir. 2004).

The invention claimed is:

1. A motor vehicle comprising:
   wheels;
   a vehicle drive;
   a brake device;
   a vehicle component which heats up when the vehicle drive and/or the brake device are operated;
   a warning indicator to output first visual warning information when a vehicle component-specific limiting temperature is exceeded by the vehicle component; and
   a light source disposed at the vehicle component to at least partially illuminate the vehicle component to output second visual warning information, when the limiting temperature is exceeded by the vehicle component and/or when the vehicle component receives an information item which relates to the limiting temperature being exceeded, and only when a predetermined compartment of the motor vehicle is opened or when the motor vehicle is stationary, and is prevented from illuminating the vehicle component when the motor vehicle is not stationary; and
   a controller configured:
      to determine, based on a rotational speed of the wheels, whether the motor vehicle is stationary, and
      to prevent the light source from illuminating the vehicle component, independently of whether the predetermined compartment of the motor vehicle is opened or closed, when the controller determines, based on the rotational speed of the wheels, the motor vehicle is not stationary, even when the limiting temperature is exceeded by the vehicle component,
   wherein
   the warning indicator includes a material applied to the vehicle component which changes color characteristics to output the first visual warning information, when the limiting temperature is exceeded, and the material comprises a predetermined three-dimensional surface patterning to improve visual perceptibility when the limiting temperature is exceeded.

2. The motor vehicle as claimed in claim 1, wherein the warning indicator further outputs additional visual warning information using a thermochromic element which is connected to the vehicle component, and/or a thermochromic substance which is contained within the vehicle component, wherein the material applied to the vehicle component is a thermochromic coating.

3. The motor vehicle as claimed in claim 1, wherein the light source is formed of a material which produces a red or reddish light when heated to provide the second visual warning information.

4. The motor vehicle as claimed in claim 1, wherein a color intensity of the color of the vehicle component depends on a temperature of the vehicle component.

5. The motor vehicle as claimed in claim 1, wherein a secondary device disposed in an interior of the motor vehicle, outputs audible warning information when the limiting temperature is exceeded and/or when the vehicle component receives the information item which relates to the limiting temperature being exceeded.

6. The motor vehicle as claimed in claim 1, wherein the warning indicator outputs audible warning information when the limiting temperature is exceeded and/or when the vehicle component receives the information item which relates to the limiting temperature being exceeded.

7. The motor vehicle as claimed in claim 1, further comprising a proximity sensor to determine a distance of an object from the vehicle component,
wherein the light source is adaptable to output the second visual warning information when the distance is less than a predetermined threshold and the limiting temperature is exceeded and/or when the vehicle component receives the information item which relates to the limiting temperature being exceeded.

8. The motor vehicle as claimed in claim 7, wherein the object corresponds to a human body part.

9. The motor vehicle as claimed in claim 1, wherein the vehicle component corresponds to at least one of a part of the exhaust system, a part of the brake device, and the vehicle drive.

10. The motor vehicle as claimed in claim 1, wherein the material outputs first material visual warning information corresponding to a first temperature of a first region of the vehicle component, and outputs second material visual warning information corresponding to a second temperature of a second region of the vehicle component.

11. The motor vehicle as claimed in claim 1, wherein a color of the material changes in accordance with a change in temperature of the material, and an intensity of the color increases as the temperature of the material increases, and the intensity of the color decreases as the temperature of the material decreases.

12. The motor vehicle as claimed in claim 1, wherein the light source emits light that changes in color intensity in accordance with a change in temperature of the vehicle component.

13. The motor vehicle as claimed in claim 1, wherein
the material is a thermochromic coating, and
the thermochromic coating has a chemical structure that causes the thermochromic coating to exhibit a reddish color tone when the limiting temperature is exceeded.

14. The motor vehicle as claimed in claim 1, wherein the predetermined three-dimensional surface patterning includes a three-dimensional surface patterning in the form of a prism shape or in the form of a Fresnel lens shape.

15. A motor vehicle comprising:
wheels;
a vehicle drive;
a brake device;
a vehicle component which heats up when the vehicle drive and/or the brake device are operated;
a warning indicator to output visual warning information when a vehicle component-specific limiting temperature is exceeded by the vehicle component, and/or when the vehicle component receives an information item which relates to the limiting temperature being exceeded,
wherein
the warning indicator includes a light source disposed at the vehicle component to at least partially illuminate the vehicle component to output the visual warning information, when the limiting temperature is exceeded and/or when the vehicle component receives the information item which relates to the limiting temperature being exceeded, and only when a predetermined compartment of the motor vehicle is opened or when the motor vehicle is stationary, and is prevented from illuminating the vehicle component when the motor vehicle is not stationary; and
a controller to control activation of the light source based on a rotational speed of the wheels,
wherein
the brake device is disposed at at least one of the wheels,
the light source is configured to at least partially illuminate the brake device when the limiting temperature is exceeded by the vehicle component and only when the motor vehicle is stationary, and
the controller prevents the light source from illuminating the brake device when the motor vehicle is not stationary.

16. The motor vehicle as claimed in claim 15, wherein the motor vehicle includes a temperature sensor system to detect an actual temperature of the vehicle component and to communicate with the vehicle component to determine whether the limiting temperature is exceeded.

17. The motor vehicle as claimed in claim 15, wherein the information item which relates to the limiting temperature being exceeded is based on a model which relates to a heating behavior and/or cooling behavior of the vehicle component.

18. The motor vehicle as claimed in claim 1,
wherein
the brake device is disposed at at least one of the wheels,
the light source is configured to at least partially illuminate the brake device when the limiting temperature is exceeded by the vehicle component and only when the motor vehicle is stationary, and
the controller prevents the light source from illuminating the brake device when the motor vehicle is not stationary.

19. The motor vehicle as claimed in claim 15, wherein the limiting temperature is predefined or adjustable by a user.

20. The motor vehicle as claimed in claim 15, further comprising:
a memory to store the limiting temperature;
a temperature sensor system to measure an actual temperature of the vehicle component; and
a controller to compare the actual temperature with the limiting temperature, to determine whether the actual temperature exceeds the limiting temperature, and to generate the information item which relates to the limiting temperature being exceeded, when it is determined that the limiting temperature is exceeded.

21. The motor vehicle as claimed in claim 15, further comprising:
a memory to store the limiting temperature;
a model which simulates temperature behaviors of the vehicle component, to produce an estimated temperature of the vehicle component; and
a controller to compare the estimated temperature with the limiting temperature, to determine whether the estimated temperature exceeds the limiting temperature, and to generate the information item which relates to the limiting temperature being exceeded, when it is determined that the limiting temperature is exceeded.

22. The motor vehicle as claimed in claim 15, further comprising a plurality of temperature sensors distributed on a plurality of regions of the vehicle component to measure respective temperatures of the plurality of regions of the vehicle component.

23. A motor vehicle comprising:
a vehicle drive;
a brake device;
a vehicle component which heats up when the vehicle drive and/or the brake device are operated;
a warning indicator including:
   a material coupled to the vehicle component and a light source to output visual warning information when a vehicle component-specific limiting temperature is exceeded by the vehicle component, and
   an electronic audio output device configured to output audible warning information when the limiting temperature is exceeded by the vehicle component and only when the motor vehicle is stationary; and
a controller configured:
   to control activation of the light source so that the vehicle component is at least partially illuminated by the light source when the limiting temperature is exceeded by the vehicle component and only when a predetermined compartment of the motor vehicle is opened or when the motor vehicle is stationary,
   to prevent the light source from illuminating the vehicle component when the motor vehicle is not stationary, and
   to prevent the electronic audio output device from outputting the audible warning information when the limiting temperature is exceeded and the motor vehicle is not stationary
wherein
chemical properties of the material temporarily change in response to a change in temperature of the material,
when the limiting temperature is exceeded, transmission characteristics of the material change so that the material is substantially transparent, thereby revealing a warning layer of color provided on the vehicle component beneath the material, and
the controller varies a color intensity output by the light source as a function of the temperature of the vehicle component such that the color intensity output by the light source is gradually reduced during cooling of the vehicle component.

24. The motor vehicle as claimed in claim 23, wherein the material is substantially transparent when transmission characteristics of the material is at least 80%, thereby revealing the warning layer of color provided on the vehicle component beneath the material.

25. The motor vehicle as claimed in claim 23, further comprising wheels, wherein
the controller determines, based on a rotational speed of the wheels, whether the motor vehicle is stationary, and
the controller prevents the light source from illuminating the vehicle component when the controller determines, based on the rotational speed of the wheels, the motor vehicle is not stationary, even when the limiting temperature is exceeded by the vehicle component.

26. The motor vehicle as claimed in claim 15, wherein
the warning indicator further includes an electronic audio output device configured to output audible warning information when the limiting temperature is exceeded by the vehicle component and only when the motor vehicle is stationary, and
the controller prevents the electronic audio output device from outputting the audible warning information when the limiting temperature is exceeded and the motor vehicle is not stationary.

* * * * *